Nov. 1, 1966 W. H. DEMARAIS 3,282,455
RAISING AND LOWERING MECHANISM FOR CAR ROOF CARRIER
Filed Feb. 20, 1964 8 Sheets-Sheet 1

INVENTOR.
Willard H. Demarais
BY
Harness, Dickey & Pierce
ATTORNEYS.

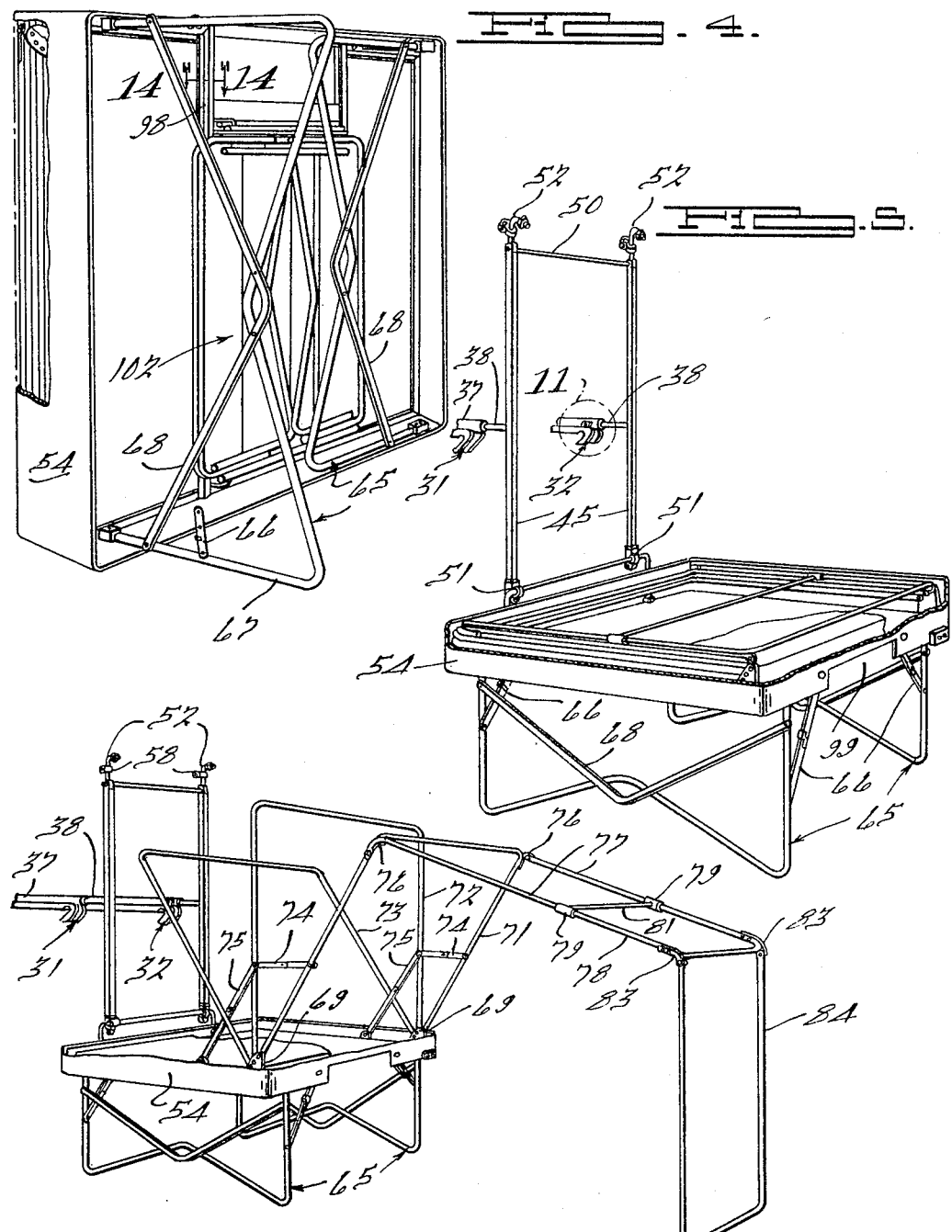

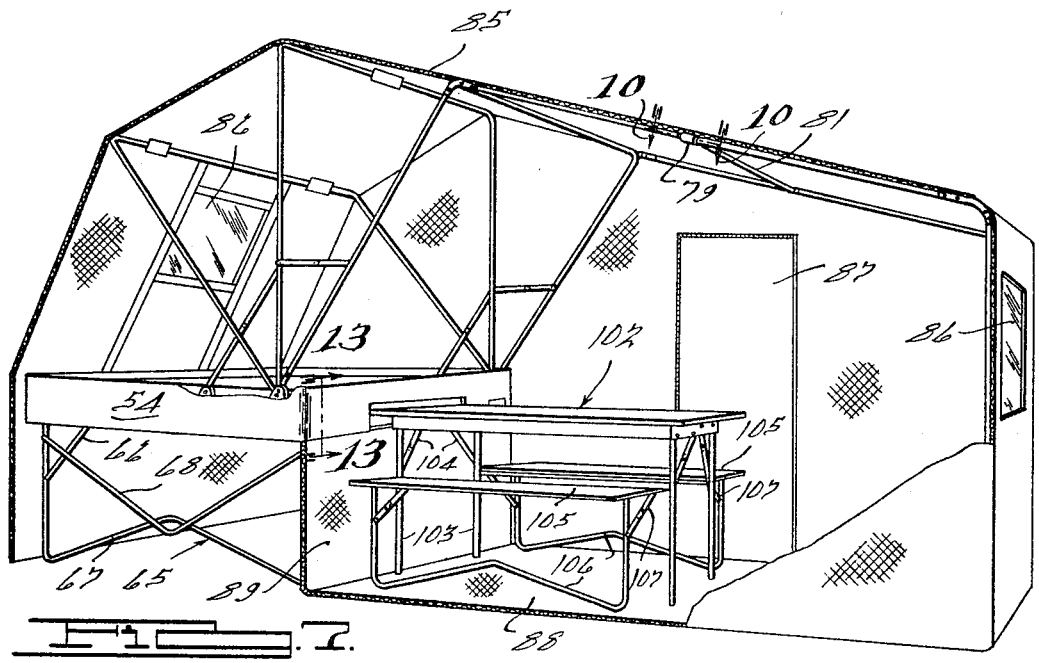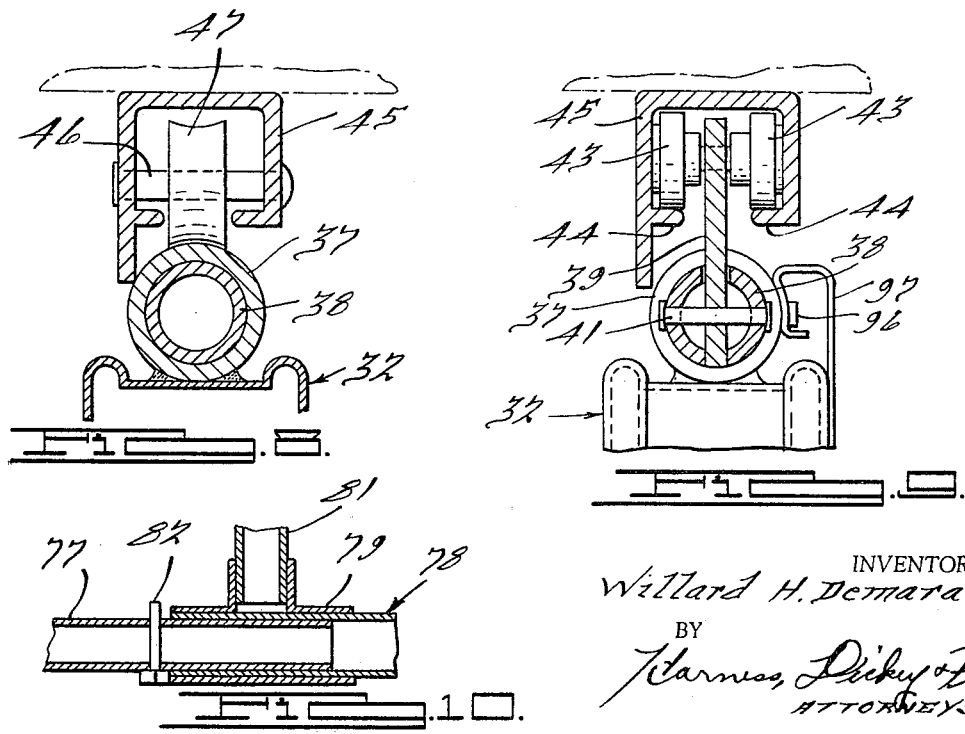

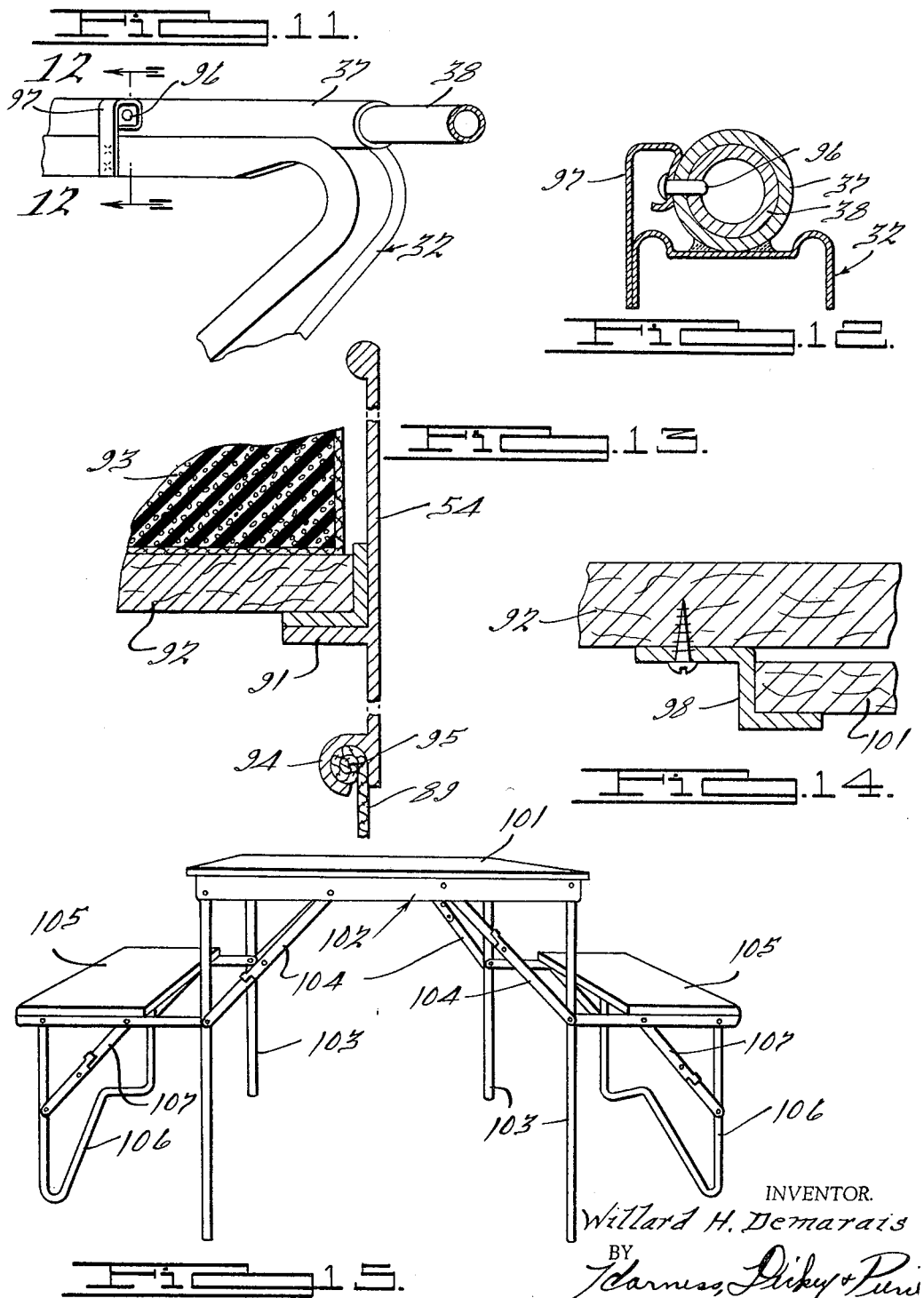

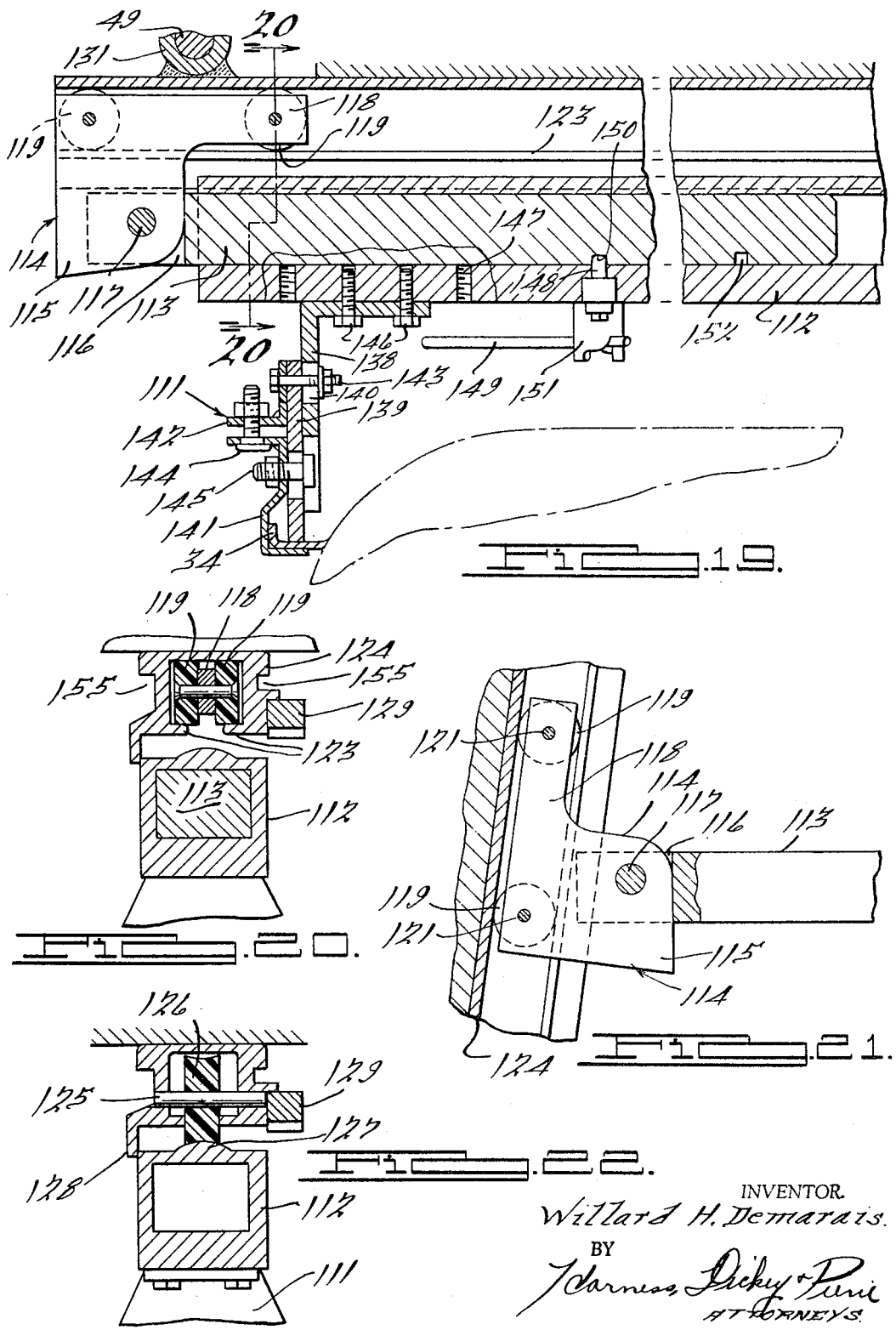

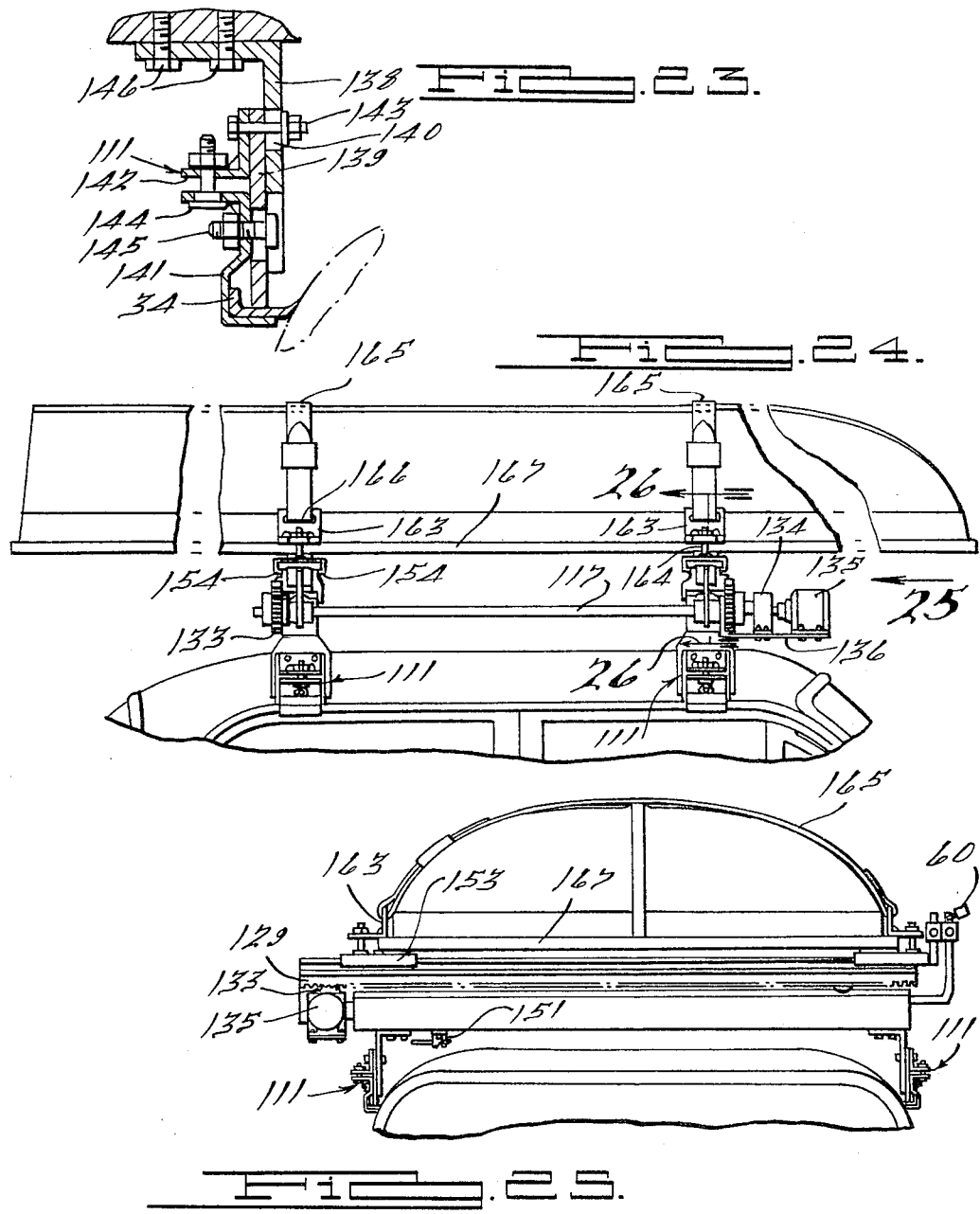

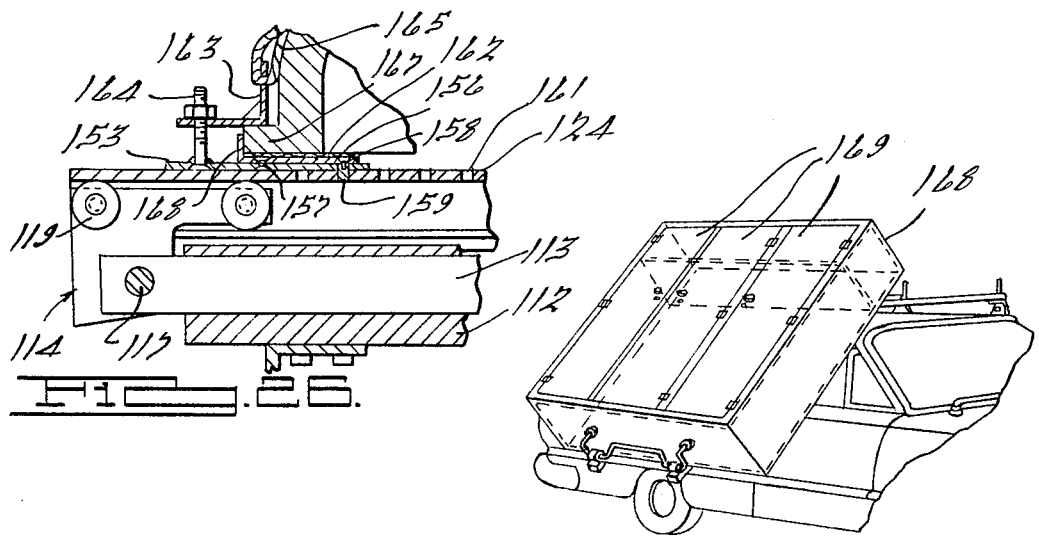
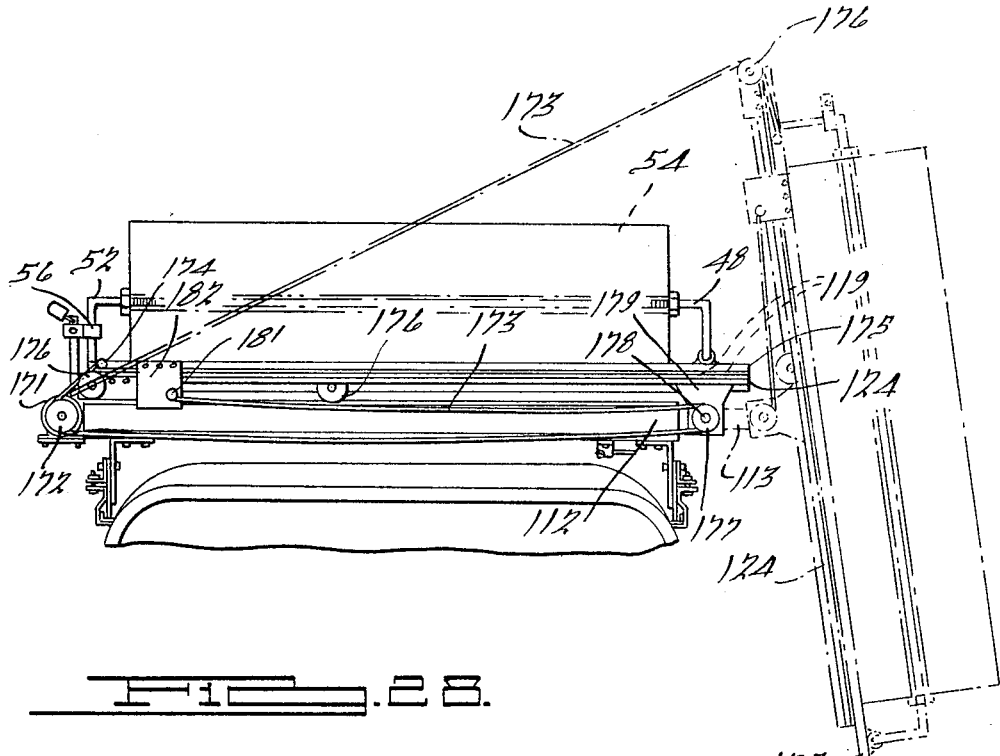

United States Patent Office 3,282,455
Patented Nov. 1, 1966

3,282,455
RAISING AND LOWERING MECHANISM FOR CAR ROOF CARRIER
Willard Homer Demarais, 20524 Lauder, Detroit, Mich.
Filed Feb. 20, 1964, Ser. No. 346,310
22 Claims. (Cl. 214—450)

This invention relates to carriers releasably secured to the top of automobiles, and particularly to a carrier which is supported on the top of a vehicle body for movement laterally and downwardly to a self-supporting position.

Carriers have been provided heretofore which are attachable and removable from a vehicle body top to which objects to be carried are directly secured or disposed in a container attached to the carrier.

The present invention pertains to a carrier supported on rails which is removably secured to the top of a vehicle body. The rails have trackways thereon to which the frame is supported for movement laterally on the rails to one side of the vehicle body where it will tilt to a vertical position and move downwardly along the side of the body. A bed frame hinges outwardly from the trackway into a horizontal position and supporting bows of a tent frame pivot outwardly thereof to different angular positions for supporting a tent over the bed and to encompass a substantial area therebeyond to provide extra room space. The bed frame and tent bows are self-supporting and the supporting trackway can be disconnected from the rails on the top of the body so that the automobile may be driven away from the area occupied by the tent. The rails on the automobile top are attachable to the trackways of the frame, and after the tent is folded and its bows are pivoted into the frame, the frame can be raised on the trackways and tilted to horizontal position onto the rails and moved laterally to a position centrally of the body where it is secured in fixed relation thereto.

A rack and pinion drive may be provided on the rails and trackways, driven by a motor from the automobile battery and used to control the lowering and raising of the frame. A cabinet may be substituted for the frame containing doors to function as a wardrobe, display case, trunk, and the like, which can be supported at the side of the body and be carried on the body top. The power device for raising or lowering the frame or container may consist of a pair of cables and pulleys which control the tilting and movement of the frame in horizontal and vertical positions, and supporting means may be employed for attaching a boat to the trackways.

Accordingly, the main objects of the invention are: to provide space rails securable laterally across the vehicle body top having trackways thereon to which a frame is supported for movement laterally of the body top and downwardly along one side thereof; to support a bed frame on trackways which move laterally on rails attached to a vehicle body top to a vertical position at the side of the body enclosed by a tent on bows which are pivoted within the frame; to release the rails from the bed frame when it is supported on its legs to permit the automobile to be driven away from the camping area; to provide rack and pinion driven by a motor for moving the frame supporting rails from the top rails of the body and tilted from a horizontal to a vertical position when lowering it at the side of the body; to construct a table and a pair of benches as a foldable unit which is carried by the frame of the bed and movable therefrom into the room space formed by an extension of the tent over the bed, and to provide a manual or motor driven set of rails which are removably secured to the top of the vehicle body with a rack against which a boat may be tilted when disposed in vertical position which is thereafter raised and tilted to a horizontal position for transportation on the vehicle top, and in general to provide removable rails and a carrier for the top of the vehicle body which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIG. 4 is a perspective view of the carrier when disposed in position at the side of the vehicle body with one of the supporting legs of the frame in extended position;

FIG. 5 is a perspective view of the structure illustrated in FIG. 4 when the frame is disposed on its legs in horizontal position;

FIG. 6 is a view of the structure illustrated in FIG. 5 after the canvas supporting bows of the tent have been extended to open position;

FIG. 7 is an enlarged, broken, perspective view of the structure illustrated in FIG. 6, with the tent in open position and with the table and benches moved outwardly of the bed frame;

FIG. 8 is an enlarged sectional view of the structure illustrated in FIG. 3, taken along the line 7—7 thereof;

FIG. 9 is an enlarged sectional view of the structure illustrated in FIG. 3, taken along the line 9—9 thereof;

FIG. 10 is an enlarged sectional view of the structure illustrated in FIG. 7, taken on the line 10—10 thereof;

FIG. 11 is an enlarged broken view of the structure illustrated in FIG. 5, as viewed within the circle 11 thereof;

FIG. 12 is an enlarged sectional view of the structure illustrated in FIG. 11, taken on the line 12—12 thereof;

FIG. 13 is an enlarged sectional view of the structure illustrated in FIG. 7, taken on the line 13—13 thereof;

FIG. 14 is an enlarged broken sectional view of the structure illustrated in FIG. 4, taken on the line 14—14 thereof;

FIG. 15 is a perspective view of the table and bench unit illustrated in standing position;

FIG. 19 is an enlarged broken sectional view of the structure illustrated in FIG. 16, taken on the line 19—19 thereof;

FIG. 20 is a sectional view of the structure illustrated in FIG. 19, taken on the line 20—20 thereof;

FIG. 21 is a broken view of the structure illustrated in FIG. 19, with the rail member illustrated in tilted position;

FIG. 22 is an enlarged sectional view of the structure illustrated in FIG. 17, taken on the line 22—22 thereof;

FIG. 23 is a broken view of the structure illustrated in FIG. 19, with the leg of the bracket extending outwardly in the same direction as the drip molding of the vehicle body;

FIG. 24 is a view of structure, similar to that illustrated in FIG. 16, for supporting a boat for movement from a vertical to a horizontal position on the top of the vehicle body;

FIG. 25 is an end view of the structure illustrated in FIG. 24, taken from the point 25 thereof;

FIG. 26 is an enlarged sectional view of the structure illustrated in FIG. 24, taken on the line 26—26 thereof;

Figure 1:
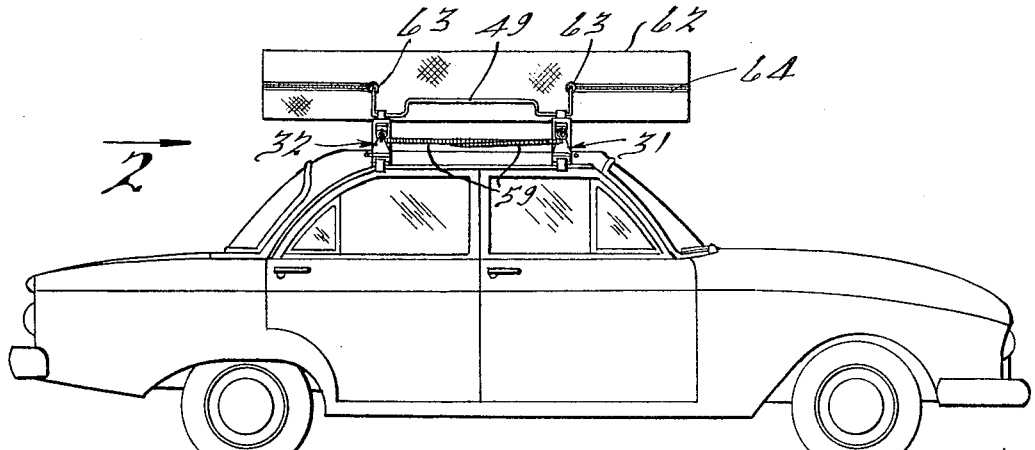
FIGURE 1 is a view in elevation of a vehicle body having a carrier on the top thereof embodying features of the present invention.
Figure 2:
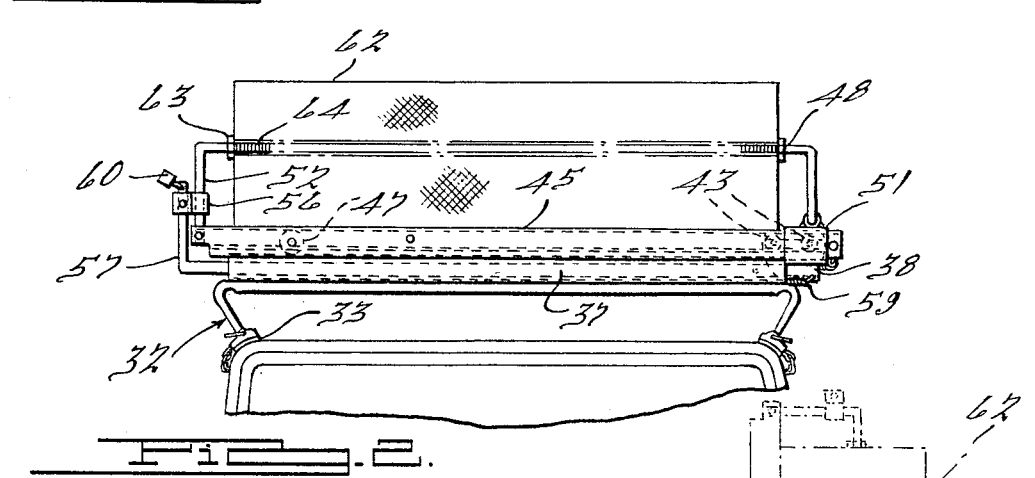
FIG. 2 is an enlarged, broken rear view of the structure illustrated in FIG. 1, as viewed from point 2 thereof.
Figure 3:
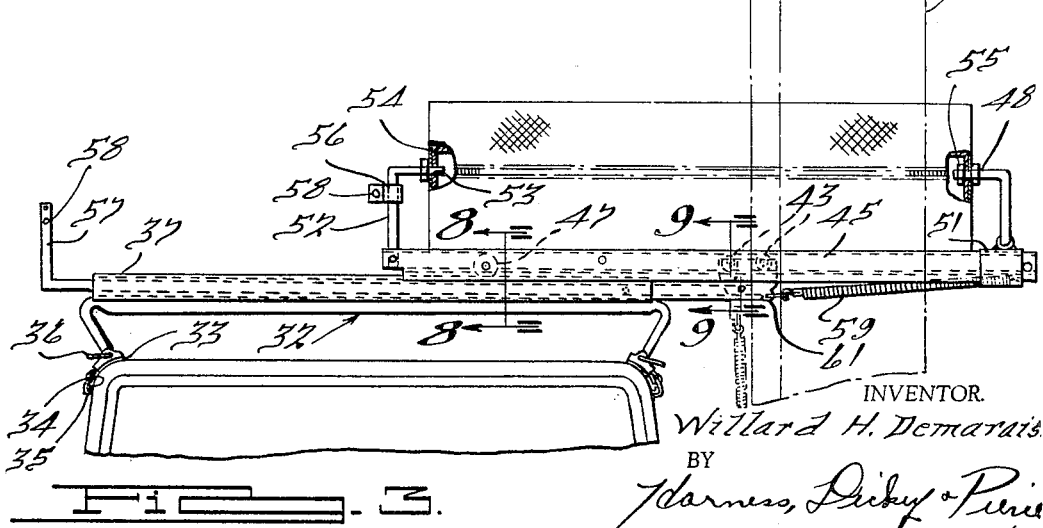
FIG. 3 is a view of the structure illustrated in FIG. 2, after the carrier has been moved laterally of the vehicle body.
Figure 16:
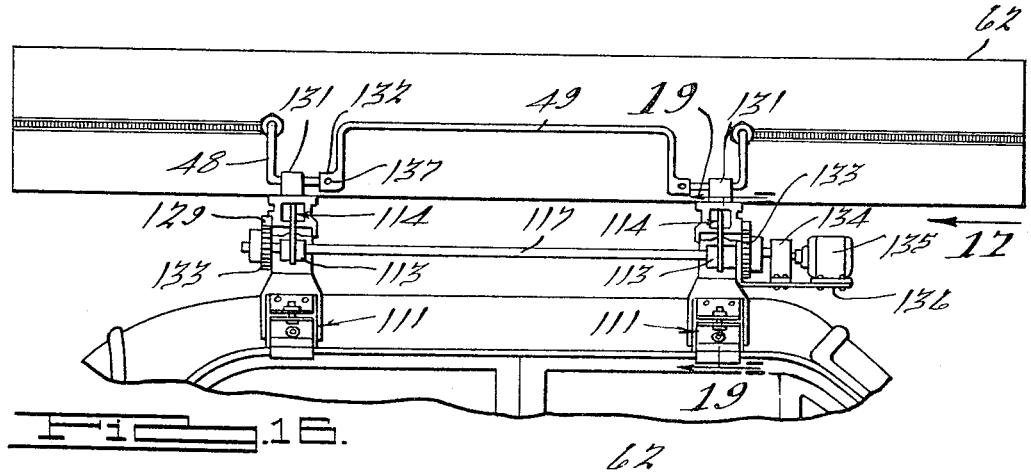
FIG. 16 is an enlarged broken view of structure, similar to that illustrated in FIG. 1, showing a further form of the invention.
Figure 17:
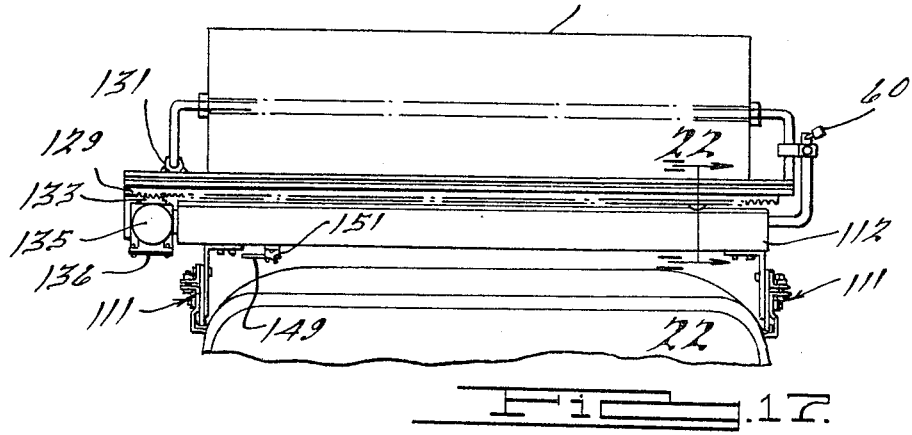
FIG. 17 is a view of the structure illustrated in FIG. 16, as viewed from the end 17 thereof.
Figure 18:
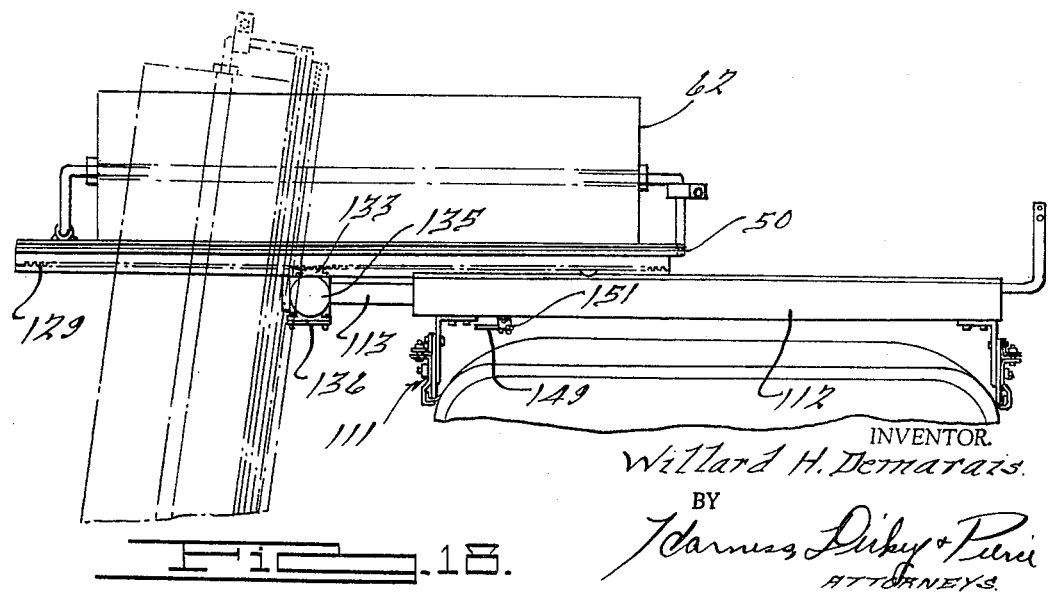
FIG. 18 is a view of the structure illustrated in FIG. 17 with the container moved laterally and, as illustrated in broken lines, tilted to a vertical position.

FIG. 27 is a view of structure similar to that illustrated in FIG. 18, with a container shown in tilted position as it is being moved from a horizontal to a vertical position at the side of the vehicle body; and FIG. 28 is a view of structure, similar to that illustrated in FIG. 3, with a cable and pulley mechanism for controlling the movement of the container to and from horizontal and vertical positions.

Referring to FIGS. 1 to 15, inclusive, the carrier of the present invention embodies: a pair of brackets 31 and 32 which are adjustably attached to plates 33 of arcuate shape which engage the side top quarter panels of the automobile body. The end of the plates 33 rests within the drain troughs 34 of the body and are drawn downwardly therein by an L-shaped finger 35 which is pivoted to an L-shaped lever 36, hinged to the plates 33. The lever 36 draws the plate downwardly into the trough as the L-shaped finger 35 is pulled upwardly into engagement with the underside thereof to securely clamp the plates 33 to the troughs. Each of the brackets 31 and 32 carry a tube 37 thereon which is welded or otherwise secured thereto. A tube 38 is telescoped within one end of each tube 37 adjacent to the side at which the carrier is to be lowered. A plate 39 has the bottom end disposed in a slot in the end of the tubes 38 where it is secured by a pin 41. The upper end of the plate 39 supports spaced axles 42 on which wheels 43 are secured for rotation on flanges 44 of rail members 45 which are disposed above the tubes 37. The rear portion of the rail members 45 supports a rivet 46 on which a wheel 47 is pivoted. The wheel has a concave periphery which mates with the arcuate surface of the tube 37, as clearly illustrated in FIG. 8.

L-shaped ends 48 of a rod-like handle 49 is secured to the front ends of the rail members 45 by brackets 51. Separate L-shaped rods 52 are secured to the rear ends of the rail members 45 in position to extend within apertures 53 of a bed frame 54. The front end of the bed frame 54 is secured to the ends of the L-shaped ends 48 by nuts 55. The vertical portion of the rods 52 have a bracket 56 thereon in the shape of a figure 8, one portion being movable up and down on the rods, the other portion being movable downwardly over the vertical portion of an L-shaped rod 57 extending from the end of the tubes 37. Matching apertures 58 through the L-shaped rod 57 and the bracket 56 receive a bolt to secure the frame and rail members in secured position on the top of the vehicle body. When the brackets 56 are released from the L-shaped rods 57, the handle 49 may be grasped and the frame 54 and rail members 45 pulled forwardly after the telescoped tubes 38 have been drawn outwardly of the tubes 37 a sufficient distance to permit the rail members 45 to assume a vertical position at the side of the body out of engagement therewith. As the rail members move forwardly, the preponderance of weight of the members and frame will be beyond the two sets of wheels 43 and the frame and members will start to tilt downwardly about the pivot 41 until disposed in vertical position as illustrated in broken lines in FIG. 3 whereupon it will move downwardly until the wheels 47 strike the plates 39 and interrupt the downward movement of the rail members 45. Springs 59 may be connected to the brackets 51 at the forward end of the rail members 45 and to the boss 61 on the plates 39 to be tensioned by the stretching thereof during the downward movement. The tension in the springs will assist in the raising of the frame 54 and rail members 45 to a position where it can be tilted horizontally and moved backwardly into carrying position.

A box-shaped canvas cover encloses the frame 54 and is provided with grommets 63 which extend over the ends of the rods 48 and 52 with zippers 64, or other securing means, disposed between the grommets and around the ends of the cover. The cover may be removed entirely or may be removed and supported by the two grommets on the ends of the rods 48. As illustrated in FIGS. 4, 5, 6 and 7, when the frame 54 is in vertical position, the L-shaped rods 52 are moved from the apertures 53 in the frame and the frame is pivoted downwardly on the brackets 51 to horizontal position. Before the frame is moved from vertical position, two sets of legs 65 are pivoted outwardly and secured in outer position by the pivoted locking links 66. The ground engaging portion 67 of the legs is preferably made of tubing while the brace member 68 is made of strap material which is riveted to the tubular portion. It is to be noted in FIG. 5 that the bed frame 54 is now self-supported on the legs 65 and if desired, the telescoped tubes 38 may be withdrawn from the tubes 37 so as to release the automobile and permit it to be moved from the camping area.

The frame 54 has a bracket 69 to which three tent bows 71, 72 and 73 are pivoted. The bows are retained in predetermined relation to each other when in open position by the pivoted locking links 74 and 75. The bow 71 carries brackets 76 at its upper ends to which tubes 77 are pivoted. A U-shaped tubular frame 78 is connected at the free ends by T-shaped fittings 79 interconnected by a section of tube 81. As illustrated more clearly in FIG. 10, the tubes 77 telescope within the tubes of the frame 78 when the frame is stored within the bed frame 54 and when moved outwardly on the tubes 77 to be retained in the extended position by pins 82. The opposite end of the frame 78 has brackets 83 secured thereto to which a U-shaped frame 84 is pivotally secured to form the outer vertical supporting portion of the tent frame. The canvas 85 which covers the tent frame is secured to the end cross members of the bows by ties or listing strips in the usual manner. The construction herein illustrated contains windows 86 at opposite ends and a door 87 in the room portion extending beyond the frame 54. The canvas forms the floor 88 and a vertical wall 89 of the room portion of the tent with the portion 89 connected to the frame 54 as more clearly shown in FIG. 13. A dividing curtain may be mounted on the tubular section 81 to form a private area for a cot or the like in the room portion at the end of the tent.

The frame 54 as herein illustrated, is made from four aluminum sections which are welded together at the corners to have inwardly extending flanges 91 on which on which a panel 92 of wood, metal or the like, rests for supporting a mattress 93 of any construction, herein illustrated as being of foam rubber. A recess formed by a curved flange 94 receives a welt 95 on the end of the canvas wall portion 89 which slides therein to be secured thereby. As illustrated in FIGS. 11 and 12, telescope tube 38 is secured within the tube 37 by a pin 96 on a spring arm 97 which permits the pin 96 to be moved outwardly so that the telescope tube 38 may be pulled outwardly a predetermined distance as explained above before moving the rail members 45 outwardly on the tubes 37. After the frame 54 has been supported on the ground, withdrawal of the pin 96 permits the tube 38 to be withdrawn from the tube 37 to thereby free the automobile from the supporting equipment.

As illustrated in FIGS. 4 and 14, the bottom of the panel 92 has a pair of spaced angle-shape brackets 98, aligned with an aperture 99 in the frame 54. The brackets 98 support the top 101 of a table and bench assembly 102. After the bed frame 54 is in horizontal position the table may be slid from the brackets 98 and through the aperture 99, after which the four legs 103 are moved to vertical position where they are secured by the locking links 104. The benches 105 are then swung outwardly with the supporting legs 106 swung downwardly and secured in position by the locking links 107. This provides a rugged table which is self-contained and which is supported within the frame 54 for storage, as pointed out hereinabove.

In FIGS. 16 to 23, a motor operated device of the present invention is illustrated. Adjustable brackets 111 which are attachable to the drain trough of the vehicle body are interconnected at the top by a hollow rectangular tube 112. A rectangular bar 113 extends within the end of the tube 112 on the side toward which the carrier is to be moved. An angle shaped plate 114 has a branch 115 pivoted within a slot 116 in the bars 113 by a shaft 117. A branch 118 carries pairs of rollers 119 on pins 121. The face 122 at the end of the branch 115 engages the web of the slot 116 and limits the tilting of the bracket to an angle less than 90°, as clearly illustrated in FIG. 21. The rollers 119 engage the flanges 123 on rail members 124 which support the frame 54 to be carried. The rear portion of the frame member 124 has a pin 125 on which is pivoted a wheel 126 having a concave periphery which mates with the convex ridge 127 on the hollow tube 112. The rail 124 is maintained aligned with the tube 112 by the convex and concave engagement between the wheel and ridge and also by a flange 128 carried by the rail member 124. The rail members 124 have racks 129 secured thereto with the teeth thereof presenting downwardly.

The shaft 117 has pinions 133 at opposite ends aligned with the racks 129 with which their teeth engage. One end of the shaft is connected to a gear reduction unit 134 driven by a motor 135 supported on a bracket 136 secured to the adjacent bar 113 carried by the rectangular tube 112. The forward end portion of the rail member 124 has sleeves 131 welded or otherwise secured thereto for supporting the handle 49 containing bushings 132 in which the end portions 48 are secured by a rivet 137. The adjustable brackets 111 consist of an L-shaped element 138, a plate member 139, a locking element 141 and a bracket 142. The bracket 142 is secured to the plate member 139 and to the L-shaped element 138 by a pair of bolts 143 which extend through vertical slots 140 in the L-shaped element. The locking element 141 is connected by a pair of bolts 144 to the bracket 142 and by a bolt 145 to the plate member 139. The L-shaped element 138 is secured by screws 146 in the plurality of apertures 147 to the hollow tube 112, as illustrated in FIG. 19. The end of the L-shaped element may be directed outwardly instead of inwardly on the structure of FIG. 20 when the automobile body has a roof of less width or when the hollow tube 112 is of greater length, as illustrated in FIG. 23. The point plate member 139 is adjustable on the L-shaped element 138 to change the distance of the end of the plate member 139 from the hollow tube 112 so as to maintain the two tubes 112 in horizontal position even though the two points on the drain trough 34 engaged by the plate member are not in horizontal alignment. When the adjustable brackets 111 are placed within the trough 34, the bolts 144 are tightened to draw the flange of the locking elements up against the bottom face of the drain troughs 34 after which the bolt 145 is tightened to further secure the locking elements 141 in fixed position.

The bar 113 is retained within the tubular member 112 by a pin 148 which extends into an aperture 150 and is withdrawn therefrom by the angular movement of a rod 149 over the sloping surface of the element 151 which moves the pin from the aperture 150. The bar can then be moved outwardly until the pin enters the aperture 152 to have the carrier clear the side of the vehicle body. When the automobile is to be released entirely from the supporting mechanism, the pin 149 is withdrawn from the aperture 152 and the bars 113 are withdrawn from the hollow tubes 112. The carrier functions in the same manner as that described hereinbefore with regard to the structure of FIGS. 1 to 15 inclusive. The brackets 56 are released from the rods 57 to permit the rail member 124 to be moved forwardly when the motor 134 is energized. As the rail members and frame 54 move forwardly, a point will be reached when the preponderance of the weight is beyond the shaft 117 whereupon the frame and rail members will tilt about the shaft 117 as the racks 129 roll about the pinions 133. The rails will continue to move down until a pin 160 ahead of the wheel 126 engages the end of the branch 118 of the plate 114. The frame and tent unfolds in the manner as pointed out hereinabove and will not be further described. After the tent has been folded into the frame 10 and tilted against the rail members 124, the motor is reversed and the rail member and frame are raised until the weight preponderance above the shaft 117 is sufficient to tilt the rail members 124 and frame 54 onto the rectangular tubes 112. The handle 49 may be grasped to aid in the tilting of the rail members and frame.

A further use of the carrier device is that for carrying a boat on the top of the automobile. The power mechanism acts as an elevator for raising the boat and moving it to a central position on the vehicle body top. The rail members 124 have a flanged channel element 153 at each end for adjustment along the members. The inturned flanges 154 at the sides of the elements 153 extend into slots 155 at the side of the rail member 124. A spring plate 156 is secured by rivets 157 to the channel element 153 and a screw 158 secures a pin 159 to the opposite end of the spring plate 156. A plurality of apertures 161 extends through the upper wall at each end of the members 124 in which the pin 155 is selectively disposed. A protective layer of cloth, plastic, or other material 166 is bonded or otherwise secured to the spring plate 156. By adjusting the pin 159 in one of the apertures 161 the elements 153 at opposite ends of the rail member 124 are adjusted to the width of the boat so that it can be secured in position by a bracket 163 on a bolt 164 attached to the channel element 153 as clearly illustrated in FIG. 26. The bracket has a strap 165 extending through a slot 166 therein for securing the boat on the brackets as illustrated in FIGS. 24 and 25. With the rail members 124 in substantially vertical position and the channel elements 153 adjusted to fit the width of the boat, the boat is tilted against the rail members 124 and positioned to have the lower rub rail 167 of the boat rest upon a flange 168 of the spring plates 156. The brackets 163 are locked against the rails 167 and the belts 165 are tightened before or after the rail members 124 and the boat is raised. The motor lifts the boat to a position where it is tilted to a horizontal position and slid across the tube members 112 with the rail members which are locked in position by the brackets 56, and a securing element in the aligned apertures 58 in the brackets and rods 57. A small padlock 60 may be applied to a second aperture in the end of the rods 57 to more securely lock the boat to the carrier. It is to be understood that the device may be operated manually or by the motor driven mechanism for raising and lowering the boat onto and from the top of the automobile.

In FIG. 27 the carrier is illustrated as embodying a container 168 secured to the rail members 124 for raising and lowering to and from the automobile body top either manually or by motor means, as pointed out hereinabove. The container 168 is illustrated as having a plurality of doors 169 and internal shelf so that it can be employed as a wardrobe when standing along the side of the automobile. Merchandise, books, appliances, tools, and other articles may be carried by the container to distribute or to display to potential customers. A canvas cover similar to the canvas cover 62 is employed over the case 168 in the same manner as the cover was employed over the frame 54 of the camping unit.

In FIG. 28 a still further form of the invention is illustrated that wherein a motor 171 is employed for driving a pulley 172 about which a cable 173 is wrapped with one free end secured by the bolt 174 to the rail member 124 and the other free end secured by a bolt 181 to slide bars 175 to which the rod members 48 and 52 which engage the frame 54 are secured. The rail members 124 have a pulley 176 aligned with the cable portion 173 extending from the pulley 172 to the bolt 174. The opposite end of the cable extends from the pulley 172 over a pulley 177 on a pivot 178 for a plate 179 containing rollers 119 on the upper end. When the frame 154 is to be tilted downwardly, the rectangular bars 113 are pulled outwardly which is possible through the slack in the cable portion 173 and upon the operation of the motor a pull is applied to the ends of the cables which are secured to the bolts 181 attached to plates 182 secured to the slide bars 175. When the motor is driven the pull on the plates 182 will move the slide bars 175 and the rail member 124 as a unit, in view of the friction therebetween, to the right as illustrated in FIG. 28. When the weight preponderance attempts to tilt the rail member 124, the cable portion 173 will control the tilting until the rail members move into a substantially vertical position with the wheels 176 in contact with the plates 179. Thereafter, a continuing pull on the cables will move the slides 175 downwardly while restrained by the cable portion 173 riding on the pulleys 176 which prevents the slide bars 175 from dropping. The reverse operation of the motor applies a pull to the cables over the pulleys 176 for raising the slide bars 175 and thereafter tilting the rail members 124 and drawing them across the tubular members 112 to carrying position on top of the automobile body. The rail members 124 are then locked in position by the bracket 56 in the manner pointed out hereinabove.

What is claimed is:

1. In a carrier for a vehicle top, a pair of spaced brackets securable transversely across the top, a pivotal carrier on each said bracket adjustable outwardly at one end thereof, releasable locking means for said carrier on said brackets, roller means on said carriers, a rail member supported on the roller means of each said carrier, and means supported on said rail members and movable to one side of the body and tiltable therewith with said carriers to a substantial vertical position.

2. In a carrier for a vehicle top, a pair of spaced brackets securable transversely across the top, a pivotal carrier on each said bracket adjustable outwardly at one end thereof, releasable locking means for said carrier on said brackets, roller means on said carriers, a rail member supported on the roller means of each said carrier, and means supported on said rail members and movable to one side of the body and tiltable with said carriers to a substantial vertical position and movable downwardly on said vertically disposed carriers to a stop position.

3. In a carrier for a vehicle top, a pair of spaced brackets securable transversely across the top, elements at one end of said brackets which are movable outwardly thereof, releasable locking means for securing said elements on said brackets against outward movement, a pivotal carrier on each said element, roller means on said carriers, a rail member supported on the roller means of each said carrier, and means supported on said rail members and movable therewith to one side of the body and downwardly on said tilted carriers to a substantially vertical position.

4. In a carrier for a vehicle top, a pair of spaced brackets securable to the top, elements at one end of said brackets which are movable outwardly thereof, releasable locking means for securing said elements on said brackets against outward movement, a pivotal carrier on each said element, roller means on said carriers, a rail member supported on the roller means of each said carrier, means supported on said rail members and movable therewith to one side of the body and downwardly on the roller means of the tilted carriers to a substantially vertical position, said supported means being a frame which is pivoted to said rail members and pivotal therefrom to a horizontal position, and legs on said frame member by which it is independently supported.

5. In a carrier for a vehicle top, a pair of spaced brackets securable to the top, elements at one end of said brackets which are movable outwardly thereof, a pivotal carrier on each said element, roller means on said carrier, a rail member supported on the roller means of each said carrier, means supported on said rail members and movable therewith to one side of the body and downwardly on the roller means of the tilted carriers to a substantially vertical position, said supported means being a frame which is pivoted to said rail members and pivotal therefrom to a horizontal position, legs on said frame member by which it is independently supported, and means for releasing said elements from the brackets to separate the frame from the vehicle.

6. In a carrier for a vehicle top, a pair of spaced brackets securable to the top, elements at one end of said brackets which are movable outwardly thereof, a pivotal carrier on each said element, roller means on said carriers, a rail member supported on the rollers means of each said carrier, means supported on said rail members and movable therewith to one side of the body and downwardly on the roller means of the tilted carriers to a substantially vertical position, said supported means being a frame which is pivoted to said rail members and pivotal therefrom to a horizontal position, legs on said frame member by which it is independently supported, and bows pivotally supported within the frame for movement outwardly thereof into tent supporting position.

7. In a carrier for a vehicle top, a pair of spaced brackets securable to the top, elements at one end of said brackets which are movable outwardly thereof, a pivotal carrier on each said element, roller means on said carriers, a rail member supported on the roller means of each said carrier, means supported on said rail members and movable therewith to one side of the body and downwardly on the roller means of the tilted carriers to a substantially vertical position, said supported means being a frame which is pivoted to said rail members and pivotal therefrom to a horizontal position, legs on said frame member by which it is independently supported, bows pivotally supported within the frame for movement outwardly thereof into tent supporting position, and a tent secured to said bows and to two pivoted extensions thereof to encompass said frame and to extend therebeyond to form a room.

8. In a carrier for a vehicle top, a pair of spaced brackets securable to the vehicle top, elements telescoped at one end of said brackets which are movable outwardly thereof, releasable locking means for securing said elements within said brackets, a pivotal carrier on each said element, rollers means on said carriers, a rail member supported on the rollers means of each said carrier, means on the opposite end of said rail members for engagement with said brackets, and means supported on said rail members and movable therewith to one side of the body and to a substantially vertical position on the roller means of the tilted carriers alongside thereof.

9. In a carrier for a vehicle top, a pair of spaced brackets securable to the vehicle top, elements telescoped at one end of said brackets which are movable outwardly thereof, releasable locking means for securing said elements within said brackets, a pivotal carrier on each said element, roller means on said carriers, a rail member supported on the roller means of each said carrier, means on the opposite end of said rail members for engagement with said brackets, and means supported on said rail members and movable therewith to one side of the body and to a substantially vertical position on the roller means of the tilted carriers alongside thereof, said rail members being movable downwardly on said carriers to a stop position.

10. In a carrier for a vehicle top, a pair of spaced brackets securable to the top, elements at one end of said brackets which are movable outwardly thereof, a pivotal carrier on each said element, roller means on said carriers, a rail member supported on the roller means of each said carrier, means supported on said rail members and movable therewith to one side of the body and downwardly thereof on the roller means of the tilted carriers to a substantially vertical position, said supported means being a frame which is pivoted to said rail members and pivotal therefrom to a horizontal position, legs on said frame member by which it is independently supported, bows pivotally supported within the frame for movement outwardly thereof into tent supporting position, a tent secured to said bows and to two pivoted extensions thereof to encompass said frame and to extend therebeyond to form a room, and a canvas container the shape of said frame extending thereover when in carrying position to protect the frame and its contents.

11. In a carrier for a vehicle top, a pair of spaced brackets securable transversely across the top, a pivotal carrier on each said bracket adjustable outwardly at one end thereof, roller means on said carriers, a rail member supported on the roller means of each said carrier, and means supported on said rail members and movable to one side of the body and tiltable with the carriers to a substantial vertical position, a rack on each said rail member, and a pinion on each said bracket engaging said racks.

12. In a carrier for a vehicle top, a pair of spaced brackets securable transversely across the top, a pivotal carrier on each said bracket adjustable outwardly at one end thereof, roller means on said carriers, a rail member supported on the roller means of each said carrier, means supported on said rail members and movable to one side of the body and tiltable with the carriers to a substantial vertical position, a rack on each said rail member, a pinion on each said bracket engaging said racks, and a shaft driving said pinions and forming the pivot of said carriers so as to have the racks roll around the pinions when the rail members tilt about the shaft.

13. In a carrier for a vehicle top, a pair of spaced brackets securable transversely across the top, a pivotal carrier on each said bracket adjustable outwardly at one end thereof, roller means on said carriers, a rail member supported on the roller means of each said carrier, means supported on said rail members and movable to one side of the body and tiltable with the carriers to a substantial vertical position, a rack on each said rail member, a pinion on each said bracket engaging said racks, a shaft driving said pinions and forming the pivot of said carriers so as to have the racks roll around the pinions when the rail members tilt about the shaft, and motor means for driving said shaft and moving the rail members outwardly of said brackets and controlling the tilting thereof and the downward movement of the rail members on the carriers.

14. In a carrier for a vehicle top, a pair of spaced brackets securable transversely across the top, a pivotal carrier on each said bracket adjustable outwardly at one end thereof, releasable locking means for securing said carriers to said brackets, roller means on said carriers, a rail member supported on the roller means of each said carrier, and means supported on said rail members and movable to one side of the body and tiltable with the carriers to a substantial vertical position, said supported means being a container, the contents of which is made accessible when the container is positioned along one side of the vehicle.

15. In a carrier for a vehicle top, a pair of spaced brackets securable to the top, elements at one end of said brackets which are movable outwardly thereof, a pivotal carrier on each said element, roller means on said carriers, a rail member supported on the roller means of each said carrier, means supported on said rail members and movable therewith to one side of the body and downwardly thereof on the roller means of the tilted carriers to a substantially vertical position, said supported means being a frame which is pivoted to said rail members and pivotal therefrom to a horizontal position, legs on said frame member by which it is independently supported, and a table carried by said frame having benches secured thereto forming a unit.

16. In a carrier for a vehicle top, a pair of spaced brackets securable to the top, elements at one end of said brackets which are movable outwardly thereof, a pivotal carrier on each said element, roller means on said carriers, a rail member supported on the roller means of each said carrier, means supported on said rail members and movable therewith to one side of the body and downwardly thereof on the roller means of the tilted carriers to a substantially vertical position, said supported means being a frame which is pivoted to said rail members and pivotal therefrom to a horizontal position, legs on said frame member by which it is independently supported, and a table carried by said frame having benches secured thereto forming a unit, said unit, table and benches, having legs which are unfolded to support the benches and table while attached to each other.

17. In a carrier for a vehicle top, a pair of spaced brackets securable to the top, elements at one end of said brackets which are movable outwardly thereof, a pivotal carrier on each said element, roller means on said carriers, a rail member supported on the roller means of each said carrier, means supported on said rail members and movable therewith to one side of the body and downwardly thereof on the roller means of the tilted carriers to a substantially vertical position, said supported means being a frame which is pivoted to said rail members and pivotal therefrom to a horizontal position, and legs on said frame members by which it is independently supported, said frame having an inward extending flange for supporting a mattress supporting element.

18. In a carrier for a vehicle body top, a pair of brackets securable to the top, elements at one end of said brackets which are movable outwardly thereof, a pivotal carrier on each element, roller means on said carriers, a rail member supported on the roller means for movement on each carrier, and means near the opposite end of said rail members for releasably engaging said brackets for movement therefrom when said rail members are tilted with the carriers to substantially vertical position at the side of the body.

19. In a carrier for a vehicle body top, a pair of brackets securable to the top, elements at one end of said brackets which are movable outwardly thereof, a pivotal carrier on each element, roller means on said carriers, a rail member supported on the roller means for movement on each carrier, means near the opposite end of said rail members for releasably engaging said brackets for movement therefrom when said rail members are tilted with the carriers to substantially vertical position at the side of the body, and means on said rail members for movement downwardly on the roller means of said carriers, after the rail members are in substantially vertical position.

20. In a carrier for a vehicle body top, a pair of brackets securable to the top, elements at one end of said brackets which are movable outwardly thereof, a pivotal carrier on each element, roller means on said carriers, a rail member supported on the roller means for movement on each carrier, means near the opposite end of said rail members for releasably engaging said brackets for movement therefrom when said rail members are tilted with the carriers to substantially vertical position at the side of the body, adjustable blocks on said rail members for engagement with the side edges of a boat, and clamping means on said blocks for securing the boat to the rail members.

21. In a carrier for a vehicle body top, a pair of brackets securable to the top, elements at one end of said brackets which are movable outwardly thereof, a pivotal carrier on each element, roller means on said carriers, a rail member supported on the roller means for movement on each carrier, means near the opposite end of said rail members for releasably engaging said brackets for movement therefrom when said rail members are tilted with the carriers to substantially vertical position at the side of the body, adjustable blocks on said rail members for engagement with the side edges of a boat, clamping means on said blocks for securing the boat to the rail members, and supporting means for a strap on said clamping means.

22. In a carrier for attachment to a vehicle top, a pair of L-shaped elements attachable to the ends of a cross member, a plate adjustable lengthwise and angularly on the elements for disposition within a drain trough of the vehicle, a pair of L-shaped brackets supported on the face of said plate which are drawn together to have a flange on one of said brackets engage the underside of the drip trough, and means for securing said L-shaped brackets to said plate.

References Cited by the Examiner

UNITED STATES PATENTS

| | | | |
|---|---|---|---|
| 2,506,421 | 5/1950 | Hacker et al. | 214—450 |
| 2,547,083 | 4/1951 | Lundgren | 214—451 |
| 2,778,517 | 1/1957 | Weinstein et al. | 214—450 |
| 2,828,035 | 3/1958 | Kuchinskie | 214—450 |
| 2,907,077 | 10/1959 | Pugsley | 5—119 X |
| 3,112,041 | 11/1963 | Havens | 214—450 |
| 3,193,124 | 7/1965 | Essling | 214—350 |

FOREIGN PATENTS

| | | |
|---|---|---|
| 199,522 | 9/1958 | Austria. |
| 651,590 | 11/1962 | Canada. |
| 672,587 | 10/1963 | Canada. |
| 1,016,168 | 8/1952 | France. |

HUGO O. SCHULZ, *Primary Examiner.*